Dec. 16, 1958     J. J. NASTRONERO     2,864,959
TARGET TRACKER
Filed June 16, 1955     2 Sheets-Sheet 1
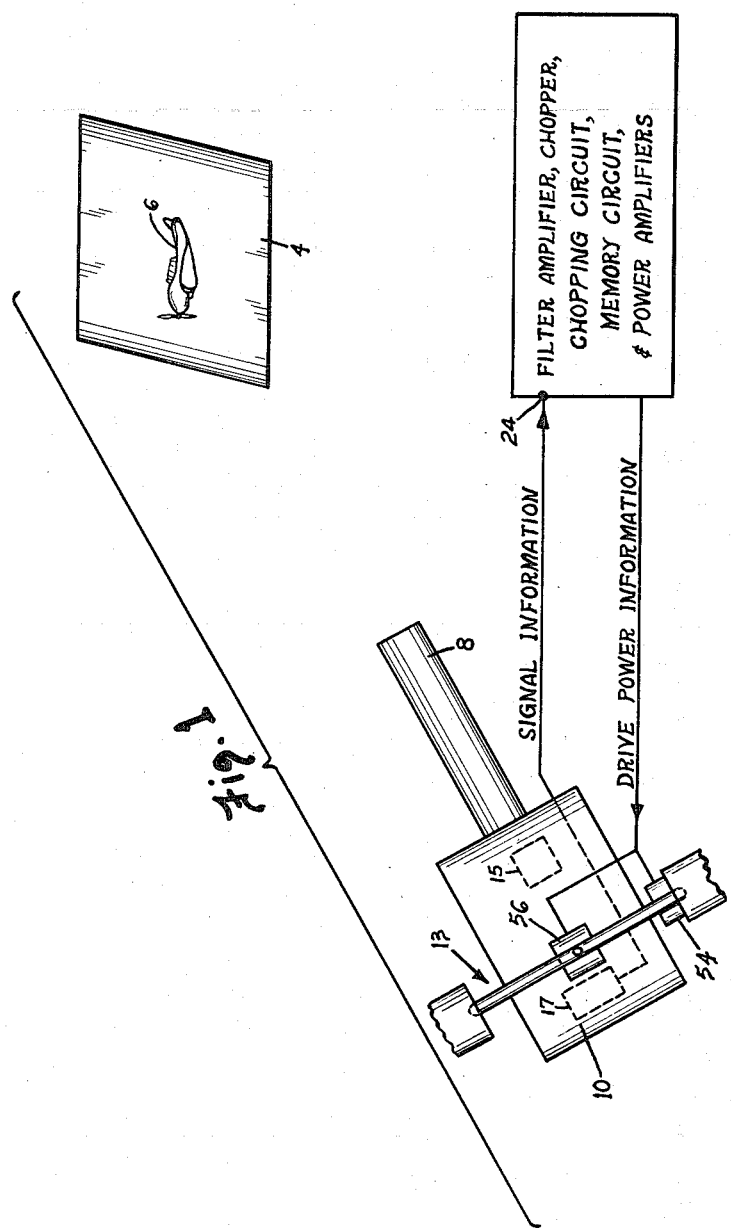
INVENTOR.
JOHN J. NASTRONERO
BY
*Louis B. Applebaum*
ATTORNEYS

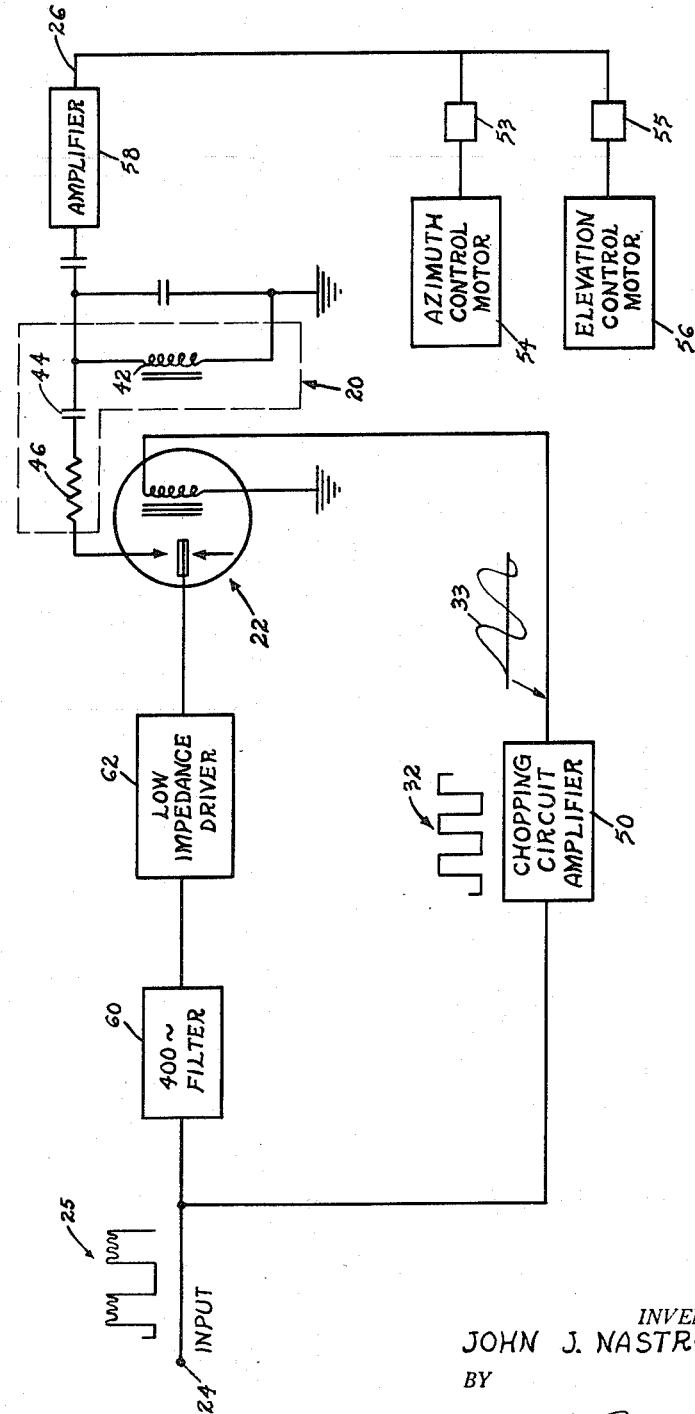

2,864,959
TARGET TRACKER

John J. Nastronero, Port Washington, N. Y.

Application June 16, 1955, Serial No. 516,053

5 Claims. (Cl. 250—203)

(Granted under Title 35, U. S. Code (1952), sec. 266)

The invention described herein may be manufactured and used by or for the Government of the United States of America for governmental purposes without the payment of any royalties thereon or therefor.

This invention relates to improvements in tracking devices, and more particularly pertains to tracking devices having a memory circuit that permits the tracking of a vehicle in a relatively smooth continuous manner regardless of the discontinuity of the input signal.

Tracking devices utilized to trace the path of travel of a vehicle can be of the optical type, or can comprise a radar or sonar unit. However, in such devices, the tracked vehicle is often lost because the input signal is not continuous. The utilization of a memory circuit in combination with an optical tracking device, to establish a continuous line of sight to a projected image that is interrupted at a high rate, provides a solution of this problem.

The optical tracking device of the subject invention comprises a telescope and a scanning mirror to scan a projected image that is interrupted 48 times a second. To prevent the tracking device from orienting itself by a discontinuous jump each time that the image appears, a memory circuit incorporated within the tracker anticipates the course of travel of the representation of the vehicle during the no target signal or "light off" period. The memory circuit receives and stores information when the representation is scanned, and feeds this information back, in a slowly decaying wave form, during the "light off" period. The telescope and scanning mechanism are positioned automatically in azimuth and elevation by the input information to track the moving vehicle.

A primary object of this invention to provide a device that establishes a continuous line of sight reference to a projected target.

Another object is to provide a memory circuit to feed a slowly decaying signal of the proper phase to an optical tracking device during loss of target information, to generate a continuous line of sight reference to a tracked device.

Other objects and many of the attendant advantages of this invention will be readily appreciated as the same becomes better understood by reference to the following detailed description when considered in connection with the accompanying drawings wherein:

Fig. 1 is a diagrammatic view of the overall system for establishing a continuous line of sight to a projected image of a moving vehicle, showing a preferred embodiment of the invention; and Fig. 2 is a block and schematic diagram of the novel circuits thereof.

Similar numerals refer to similar parts throughout the several views.

Fig. 1 shows a projection screen 4, positioned to receive and display an image 6 from a motion picture projector by conventional front or back projection methods, as viewed by a telescope 8 and a photoelectric scanning mechanism 10 mounted in a universal gimbal 13. The target image that is in the field of the telescope is modulated at 400 cycles by a semi-circular mirror shutter scanner 15 that is rotated at 400 revolutions per second by a two-pole, 400 cycle synchronous motor having an armature polarized to insure phase synchronization. The modulated light reflected from the shutter is directed to and viewed by a phototube 17 that generates an amplitude and phase modulated 400 cycle carrier signal, the amplitude being a function of the radial distance of the target image from the optical axis, and the phase being the angular position of the image thereabout.

The display of the projected vehicle is interrupted 48 times a second, thus interrupting the phototube output 48 times a second. During each interruption or "light out" period the phototube output drops to zero and does not supply any tracking information.

At this instant the telescope begins to hunt in an erratic manner for a non-existant target, or possibly remains motionless. In the first instance, when the target reappears, it can be beyond the optical view field of the telescope, thus failing to establish a true track of the projected image. In the second instance, the telescope is moved rapidly to a new position at each "light on" period, thus tracking the vehicle path in short sudden jumps with the possibility of overshooting and oscillating about the terminal point of each jump.

To promote smooth tracking from the discontinuous input information, a memory circuit is employed. The memory circuit consists of a high Q resonant 400 cycle network 20 (Fig. 2) which feeds the azimuth and elevation restoring motors 54 and 56 respectively through conductor 26 from amplifier 58. During a major portion of the "light on" (projected display of the vehicle) period, the phototube signal having a distinctive wave form 25 is fed to the resonant network 20 through a chopper 22 from a low impedance driver 62 and 400 cycle filter 60. Just prior to the changing of frames by the projector or "light off" period, the chopper 22 bars the phototube signal from the resonant circuit. The resonant circuit then dissipates some of its stored energy to fill in the "light off" interval with a slowly decaying 400 cycle signal of the proper phase. The chopper switching action is synchronized to the light interruption by driving an exciting coil of the chopper with a 48 cycle component of the phototube signal from the chopping circuit amplifier 50.

The input signal from the phototube is fed into the device at terminal 24, where said signal is fed simultaneously to the 400 cycle filter 60 and the chopping circuit amplifier 50. The signal that is fed to the filter 60 is shaped and utilized to orient the telescope and scanning device by means of azimuth and elevation erecting motors 54 and 56 respectively. The signal that is fed into the chopping circuit amplifier 50 is shaped and utilized to control the period of operation of the chopper 22. The input signal appears as a 48 cycle per second square wave having a 400 cycle signal superimposed on the positive portion of the signal only. The negative portion of said signal is generated during that period of no projected image on "light off". (The input signal is presented graphically in Fig. 2 by wave form 25.)

The 400 cycle filter 60 blocks the low frequency 48 cycle wave of the input signal, but allows the higher 400 cycle error signal to pass through to the low impedance driver 62. The amplified error signal from the driver is fed to the memory circuit 20 through the chopper 22. This signal is then further amplified, damped, amplified in the amplifier 58, and is then fed to azimuth and elevation power amplifiers 53 and 55 respectively. The amplifiers feed the control windings of the azimuth and elevation motors 54 and 56 respectively.

The input signal fed to the chopping circuit amplifier 50 is modified by removing the 400 cycle per second error signal. The 48 cycle per second square wave 32 is shaped in the chopping circuit amplifier 50 to form a 48 cycle per second sine wave 33 that is fed into the chopper 22 to control its rate of oscillation.

During a major portion of the "light on" period the input signal from the phototube is fed from a low impedance driver to the resonant network 20 through the chopper 22. Immediately prior to the "light off" or loss of signal period, the chopper 22 disconnects the phototube signal from the resonant circuit 20. Said circuit 20 then dissipates some of its stored energy to the amplifier 58 to fill in the no signal period during the "light off" interval with a slowly decaying 400 cycle signal having the same phase relationship as the original signal. The chopper switching action is synchronized to the light interruption cycle by driving an exciting coil from the 48 cycle component of the phototube signal. A potentiometer in the chopping amplifier 50 functions as the chopper phase control and is adjusted to key the phototube signal to the memory circuit during the "light on" interval. Another potentiometer in said amplifier 50 functions as a wave-shaping control to level the upper portion of the 48 cycle per second signal. The memory circuit 20 comprises the series coupled combination of coil 42, condenser 44 and resistance 46. In operation, during the "light on" period, the phototube generates a signal that feeds the memory circuit and at the same time is utilized to position the telescope and scanning mechanism. During the "light off" period, the chopper 22, actuated by the sine wave signal from the chopping circuit amplifier 50, disconnects the memory circuit 20 from the input circuit. The memory circuit then functions as the input signal source to feed a signal into the system. The signal from the memory circuit is in phase with the original signal and decays slowly. As soon as the "light on" period starts, the signal from the chopping circuit amplifier activates the chopper to allow the output of the phototube to feed through the memory circuit to the amplifier to orient the telescope and scanning device.

The memory circuit functions as an integrator to anticipate the true, continuous path of travel of the tracked vehicle during the "light out" periods. By utilizing the signal from the memory circuit as a primary source of information during the "light out" period, the tracked vehicle is not lost, nor is the telescope and scanning mechanism subjected to sudden erratic jumps, nor does the tracking device hunt or overshoot the true target position at each instant that the projected target appears on the screen. Thus the memory circuit, when utilized in combination with a radar or sonar unit, will prevent complete loss of contact with a tracked vehicle under conditions of intermittently received input information.

The optical system, in combination with the memory circuit, can be utilized to accurately track an actual vehicle or a celestial body instead of a projected image. In the tracking of an actual vehicle, the interruption of input information to the tracker from the vehicle will not result in loss of the vehicle or spurious results by the tracking device.

Obviously many modifications and variations of the present invention are possible in the light of the above teachings. It is therefore to be understood that within the scope of the appended claims the invention may be practiced otherwise than as specifically described.

I claim:

1. A device for tracking intermittent targets comprising, in combination: scanning means for receiving radiation from a target which provides such radiation intermittently and for producing an output signal modulated in accordance with the spatial position of said target; orientation means coupled to move said scanning means; circuit means connected to receive the output signal of said scanning means for converting said output signal into signals capable of driving said orientation means so that said scanning means tracks said target; and memory means connected to said circuit means for providing a signal having the same characteristics as those possessed by the modulation component of the scanning-means output signal immediately prior to any cessation of radiation from said target so that, due to this substitutive signal supplied by said memory means, said scanning means is impelled during the periods in which target radiation is not received to continue along the tracking course it was following immediately prior to the cessation of radiation.

2. A device as set forth in claim 1, wherein said memory means comprises a high-Q resonant network.

3. A device for tracking intermittent targets comprising, in combination: scanning means for receiving radiation from a target which provides such radiation intermittently and for producing an output signal having a modulation component in accordance with the spatial position of said target; orientation means coupled to drive said scanning means; circuit means connected to receive the output signal of said scanning means for extracting said modulation component from said output signal and converting said modulation component into signals capable of driving said orientation means so that said scanning means tracks said target; and memory means comprising a high-Q resonant network connected to said circuit means for providing a signal having the same characteristics as those possessed by the modulation component of the scanning-means output signal immediately prior to any cessation of radiation from said target so that, due to this substitutive signal supplied by said memory means, said scanning means is impelled during the periods in which target radiation is not received to continue along the tracking course it was following immediately prior to the cessation of radiation.

4. A device for tracking intermittent targets comprising, in combination: scanning means for receiving radiation from a target which provides such radiation intermittently and for producing an output signal having a modulation component in accordance with the spatial position of said target; orientation means coupled to drive said scanning means; filter means connected to receive the output signal of said scanning means and extract the modulation component therefrom; memory means comprising a high-Q resonant network connected to said orientation means; and synchronous switch means connected between said filter means and said memory means, said switch means being adapted to supply the output of said filter means to said memory means and to said orientation means whenever target radiation is received and to disconnect said filter means whenever target radiation is interrupted, said resonant network supplying a substitutive signal to said orientation means whenever said filter means is disconnected, said substitutive signal having the same characteristics as those of the filter means output signal immediately prior to the interruption of target radiation, the effect of the substitutive signal being to drive the scanning means along the same tracking course it was pursuing immediately prior to the interruption of radiation from said target.

5. A device for tracking intermittent targets comprising, in combination: lens means for receiving light radiated by an intermittently radiative target; mirror-shutter means for modulating the received light at a higher frequency than the interruption rate of the light radiated from the target, the modulation characteristics being in accordance with the position of said target relative to the optical axis of said lens means; phototube means receiving the modulated light from the mirror-shutter means and producing a modulated electrical signal corresponding to said modulated light, the carrier component being a series of pulses corresponding in duration to the radiative period of said target and the modulation component characteristics being in accordance with the position of the target relative to the optical axis of said lens means; filter means connected to receive and to permit passage of the modulation component only; a first amplifier for amplifying said modulation component; signal-chopping means connected to said first amplifier; a second amplifier; a high-Q resonant network connected between the output of said signal-chopping means and the input of said second amplifier; circuit means connected to receive said modulated electrical signal from said phototube, extract the carrier component therefrom and convert it into a sine wave signal having the same frequency as the carrier component, said sine wave being applied to operate said chopping means so that when light is received from said target said chopping means applies said modulation component of the modulated electrical signal to said resonant network and said second amplifier, and when light is not received from said target said first amplifier is disconnected from said resonant network, the input to said second amplifier being supplied by the energy stored in said resonant circuit, said resonant circuit providing a signal having the same characteristics as the modulation component had at the last instant light was received from the target; and motor means connected to receive the output of said second amplifier and mechanically coupled to drive said lens means so that it optically tracks said target, the sine wave signal fed to said second amplifier by said resonant network during the periods when light is not received from the target acting to impel the lens means along the same tracking course that it was following immediately prior to the cessation of light from the target.

References Cited in the file of this patent
UNITED STATES PATENTS

| | | |
|---|---|---|
| 2,416,215 | Rath | Feb. 18, 1947 |
| 2,513,367 | Scott | July 4, 1950 |
| 2,716,208 | Coffin | Aug. 23, 1955 |